United States Patent [19]

Deininger et al.

[11] 4,405,573

[45] Sep. 20, 1983

[54] PROCESS FOR PREPARING POTASSIUM FERRATE ($K_2FEO_4$)

[75] Inventors: J. Paul Deininger; Ronald L. Dotson, both of Cleveland, Tenn.

[73] Assignee: Olin Corporation, New Haven, Conn.

[21] Appl. No.: 331,949

[22] Filed: Dec. 17, 1981

[51] Int. Cl.$^3$ .............................................. C01G 49/00
[52] U.S. Cl. .................... 423/150; 423/179; 423/275; 423/594
[58] Field of Search ............... 423/275, 594, 150, 179; 204/98, 128

[56] References Cited

U.S. PATENT DOCUMENTS

| | | |
|---|---|---|
| 2,275,223 | 3/1942 | Hardoen . |
| 2,455,696 | 12/1948 | Mosesman . |
| 2,470,784 | 5/1949 | Mosesman . |
| 2,470,785 | 5/1949 | Mosesman . |
| 2,470,786 | 5/1949 | Mosesman . |
| 2,536,703 | 1/1951 | Schreyer . |
| 2,758,090 | 8/1956 | Mills et al. . |
| 2,835,553 | 5/1958 | Harrison . |
| 3,632,802 | 1/1972 | DeMiller et al. . |
| 4,246,910 | 1/1981 | Rainer et al. . |
| 4,304,760 | 12/1981 | Mein et al. .......................... 423/594 |

FOREIGN PATENT DOCUMENTS

| | | |
|---|---|---|
| 1013272 | 8/1957 | Fed. Rep. of Germany . |
| 49-37895 | 4/1974 | Japan . |
| 51-100968 | 9/1976 | Japan . |
| 55-75925 | 6/1980 | Japan . |
| 55-75926 | 6/1980 | Japan . |

OTHER PUBLICATIONS

J. W. Mellor, A Comprehensive Tretise on Inorganic and Theoretical Chemistry, pp. 929–937, Longmans, Green & Co., London (1952).
J. C. Bailar et al., Comprehensive Inorganic Chemistry, vol. 3, Pergamon Press Ltd., pp. 1049–1051.
G. Grube and H. Gnelin, "The Effect of Superimposed Alternating Current On Anodic Ferrate Formation", Zeitschrift Fur Elektrochemie, vol. 26, Nr. 7/8, pp. 153–161, (1920).
G. Grube and H. Gnelin, "The Electrolytic Formation of the Alkali Salts of Ferrous and Ferric Oxides", Zeitschrift Fur Elektrochemie, vol. 26, Nr. 21/22, pp. 459 to 471, (1920).
J. Tousek, "Electrochemical Production of Sodium Ferrate", Collection Czechoslov. Chem. Commun., vol. 27, pp. 914 et seq, (1962).
B. Helferich et al., "Salts of Ferric Acids", Z. anorg. allg. Chemie, 263, pp. 169–174, (1950).
R. Scholder et al., "Concerning Ferrates(VI)", Z. anorg. allg. Chemie., 282, pp. 268–279.
R. J. Audette et al., "Potassium, Rubidium, Cesium and Barium Ferrate(VI): Preparation, Infrared Spectra and Magnetic Susceptibilities", Inorganic Chemistry, vol. 11, No. 8, pp. 1904–1908, (1972).
H. Hrostowski et al., "The Magnetic Susceptibility of Potassium Ferrate", Journal of Chemical Physics, vol. 18, No. 1, pp. 105–107, (Jan. 1950).
G. Thompson et al., "Preparation and Purification of Potassium Ferrate(VI)", J. Am. Chem. Soc., vol. 73, pp. 1379–1381, (Mar. 1951).
J. Schreyer et al., "Potassium Ferrate", Inorganic Synthesis, vol. IV, pp. 164–169, (1953).
Kirk–Othmer Encyclopedia of Chemical Technology (2nd Edition), vol. 12, p. 40, John Wiley & Sons, (1967).
V. M. Nerezov et al., "Mechanism of Synthesis of Ferrates", Investiya Vysshikh Uchenyka Zavendenii, Tsvetnaya Mettalurgiya, No. 4, pp. 17–21, (1972).
J. Schreyer et al., "Ferrite Oxidimetry", Anal. Chem., vol. 22, No. 5, pp. 691 and 692, (May 1950).
J. Schreyer et al., "Oxidation of Chromium(III) with Potassium Ferrate(VI)", Anal. Chem., vol. 22, No. 11, pp. 1426 and 1427, (Nov. 1950).
J. Schreyer et al., "Stability of Ferrate(VI) Ion in Aqueous Solution", Anal. Chem., vol. 23, No. 9, pp. 1312–1314, (Sep. 1951).
Z. G. Kaufman et al., "Spectrophotometry of the Ferrate(VI) Ion in Aqueous Solution", Chemist–Analyst, vol. 45, No. 1, pp. 22 & 23, (Mar. 1956).
R. Wood, "The Heat, Free Energy and Entropy of the Ferrate(VI) Ion", J. Am. Chem. Soc., vol. 80, pp. 2038–2041, (1958).
W. Griffen, "Infrared Spectra of Tetrahedial Oxyanions of the Transition Metals", Inorganic Phys. Theor.–J. Chem. Soc. (A), (1966), pp. 1467 & 1468.

V. Ettel et al., "Reactions of Very Pure Substances (V)–Ferrate Decomposition in Alkaline Solution", Collection Czechoslov. Chem. Commun., vol. 34, pp. 2182 to 2188, (1969).

A. Ito et al., "Mossbauer Study of $Fe^{+3}$ in Potassium Ferrate, K FeO", J. Phys. Soc. Japan, vol. 26, p. 1548, (1969).

H. Goff et al., "Studies on the Mechanism of Isotropic Oxygen Exchange and Reduction of Ferrate(VI) Ion $(FeO_4{}^{-2})$", Journal of American Chemical Society, vol. 93:23, pp. 6058 to 6065, (Nov. 17, 1971).

G. Christian et al., "Electrochemical Studies of Potassium Ferrate(VI)", Monatshefte fur Chemie, 106, pp. 813 to 822, (1957).

S. Vicente-Perez et al., "Analytical Chemistry of Uncommon Valences: Synthesis and Reactivity of Ferrate(VI)", Quim. Anal., vol. 30, No. 4, pp. 189–192, (1976).

Olin Literature Search, NHTIS 80-42, dated Feb. 7, 1980.

V. M. Nerezov et al., "Method of Treating Zinc-Production Solutions", U.S.S.R. Invention Certificate No. 378,472, published Apr. 18, 1973.

Williams et al., "Preparation and Alcohol Oxidation Studies of the Ferrate(VI) Ion, $FeO_4{}^{-2}$", Inorganica Chemica Acia., vol. 8, pp. 177–183, (1974).

Murmann, "The Preparation and Oxidative Properties of Ferrate Ion $(FeO_4{}^{-2})$, Studies Directed Toward Its Use as Water Purifying Agent", Missouri Water Resources Res. Center, U. of Missouri, Columbia, Mo.: Project B-091-MO(L).

Murmann et al., "Experiments Utilizing $FeO_4{}^{-2}$ for Purifying Water", Water Research, vol. 8, pp. 79 to 83, (1974).

Gilbert et al., "An Investigation of the Applicability of Ferrate Ion for Disinfection", J. Am. Water Works Assoc., vol. 68(9), pp. 495–497, (1976).

Nerezov et al., "Removal of Cyanide and Thio-Cyanate From Waste-Waters Used in Non-Ferrous Metallurgy by Oxidation with Potassium Ferrate", U.S.S.R. Invention Certificate No. 432,765, published Oct. 27, 1977.

Waite et al., "Iron(VI) Ferrate As a General Oxidant for Water and Wastewater Treatment", Ozone/Chloride Dioxide Oxid. Prod., Org. Matter Process Conference", (1976), published 1978, pp. 410–425.

*Primary Examiner*—Herbert T. Carter
*Attorney, Agent, or Firm*—Arthur E. Oaks; Donald F. Clements; William A. Simons

[57]  ABSTRACT

Disclosed is a process for making potassium ferrate $(K_2FeO_4)$ by reacting substantially pure KOH, $Cl_2$, and a ferric salt in the presence of a stabilizing proportion of at least one ferrate-stabilizing compound (e.g., a combination of an alkali metal silicate and an alkali metal iodine-containing salt). The formed $K_2FeO_4$ is separated and recovered from other reaction co-products [KCl, $H_2O$, KOCl, and $Fe(OH)_3$] and excess KOH. Other specific improvements include the following:

(i) returning KCl co-product back to a chlor/alkali membrane-type electrolytic cell and then making very pure KOH and $Cl_2$;

(ii) recylcing excess KOH back to the ferrate-forming reaction; and (iii) recovering a substantially pure dry solid $K_2FeO_4$ product by washing the above-noted $K_2FeO_4$ product in DMSO or its equivalent; and then washing with methanol or its equivalent, before drying.

28 Claims, 1 Drawing Figure

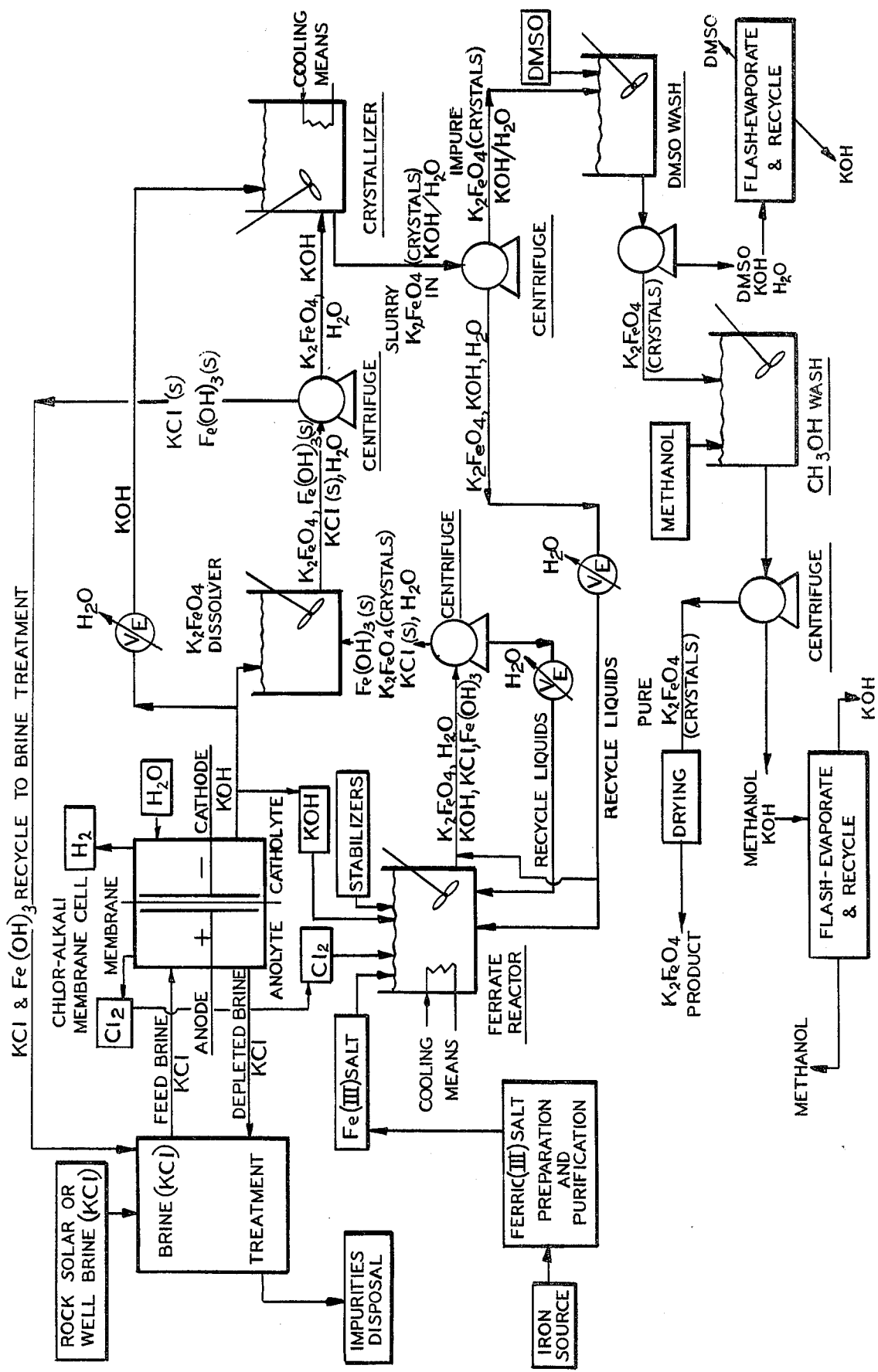

PROCESS FOR PREPARING POTASSIUM FERRATE (K2FEO4)

BACKGROUND OF THE INVENTION

1. Field of the Invention

The present invention relates to a process for preparing potassium ferrate (K2FeO4) from potassium hydroxide, chlorine and ferric salts. In particular, the present invention relates to an economically-feasible process for making potassium ferrate in large-scale quantities.

2. Description of the Prior Art

Potassium ferrate has many known uses. For example, it may be employed to bleach vegatable fibers; to effect organic reactions, to oxidize sulfurous acid, nitrites, ferrocyanides and other inorganic materials (see U.S. Pat. No. 2,758,090, which issued to Mills et al. on Aug. 7, 1956). It may be also used in the paper industry to make oxidized starches for surface sizing or in the textile industry to make oxidized starches for finishing operations (see U.S. Pat. No. 3,632,802 which issued to DeMiller et al. on Jan. 4, 1972). It may be employed to decolorize and remove impurities from alkali metal hydroxide solutions (see U.S. Pat. No. 2,536,703, which issued to Schreyer on Jan. 2, 1951).

Furthermore, potassium ferrate may be useful in oxidizing H2S in gas streams directly to sulfur (see Japanese Patent Kokai No. 74/032896 which was published on Apr. 8, 1974 and assigned to Kobayashi). It may also be used to remove manganese, antimony and arsenic during the production of zinc (see U.S.S.R. Invention Certificate No. 378,472, which issued to Nerezov et al. in April, 1973). Also, it may be used in the treatment and purification of water [see Murmann et al., "Experiments Utilizing FeO4−2 for Purifying Water", *Water Research,* Vol. 8, pages 79 to 83 (1974); Gilbert et al., "An Investigation of the Applicability of Ferrate Ion for Disinfection", *J. Am. Water Works,* Vol. 68(9), pages 495-497 (1976) and Waite et al. "Iron (VI) Ferrate As a General Oxidant For Water and Wastewater Treatment", *Ozone/Chloride Dioxide Oxid. Prod., Org. Matter Process Conference,* (1976)].

Still further, potassium ferrate may be used in non-ferrous metallurgy and mining operations (see U.S.S.R. Invention Certificate No. 432,765, which issued to Nerezov et al. on Oct. 27, 1977 and U.S.S.R. Invention Certificate No. 639,606, which issued to Konev et al on Dec. 3, 1978). In addition, potassium ferrate may be used in cigarette filters (see U.S. Pat. No. 4,246,910, which issued to Rainer et al on Jan. 27, 1981).

Many methods have been suggested for making potassium ferrate [see Mellor, *A Comprehensive Treatise on Inorganic and Theoretical Chemistry,* pages 929-937, Longmans, Green & Co., London (1952)]. One method is by the electrolysis of iron-containing materials in an electrolytic cell containing KOH or the like [see Grube et al., "The Effect of Superimposed Alternating Current On Anodic Ferrate Formation", *Zeitschrift Fur Elektrochemie,* Vol. 26, No. 7/8, pages 153 to 161 (1920) and Tousek, "Electrochemical Production of Sodium Ferrate", *Collection Czechoslov. Chem. Commun.,* Vol. 27, pages 914 et seq. (1962)].

Another method for making potassium ferrate is by fusing iron or ferric oxide (Fe2O3) with potassium nitrate in the presence of KOH (see Japanese Patent Kokai No. 80/75926, which was published on June 7, 1980 to T. Morishita).

Still another approach is the reaction of an alkali metal hypohalite salt with ferric salts or the like. Two techniques for making K2FeO4 by this hypohalite/ferric salt reaction have been suggested. One method is to first prepare Na2FeO4 in a NaOH solution by reacting a ferric salt or the like with a sodium hypohalite (e.g. NaOCl) or halogen gas (e.g. Cl2) in the presence of concentrated NaOH and then converting the Na2FeO4 into K2FeO4 by addition of KOH [see Hrostowski et al., "The Magnetic Susceptibility of Potassium Ferrate", *Journal of Chemical Physics,* Vol. 18, No. 1, pages 105-107 (January 1950); Thompson et al, "Preparation and Purification of Potassium Ferrate(VI)", *J. Am. Chem. Soc.,* Vol. 73, pages 1379-1381 (March 1951); Schreyer et al., "Potassium Ferrate", *Inorganic Synthesis,* Vol. IV, pages 164-169 (1953); and Morishita, "Production Method For Alkali Ferrates", Japanese Patent Kokai No. 80/75926, published on June 7, 1980]. While Na2FeO4 is highly soluble even in concentrated NaOH solutions, K2FeO4 will immediately precipitate from concentrated alkali metal hydroxide solutions.

The second hypohalite/ferric salt reaction technique is to directly react potassium hypochlorite, potassium hypobromite, or a halogen gas like Cl2 or Br2, with ferric salt or freshly made Fe(OH)3 in the presence of concentrated KOH to form and precipitate K2FeO4 [see U.S. Pat. No. 2,455,696, which issued to Mosesman on Dec. 7, 1948; Helferich et al., "Salts of Ferric Acids", *Z. anorg. allg. Chemie,* 263, pages 169-174 (1950); Scholder et al., "Concerning Ferrates(VI)", *Z. anorg. allg. Chemie,* 282, pages 268-279 (1955); Audette et al., "Potassium, Rubidium, Cesium and Barium Ferrate(VI): Preparation, Infrared Spectra and Magnetic Susceptibilities," *Inorganic Chemistry,* Vol. 11, No. 8, pages 1904-1908 (1972); and Morishita, "Production Method for Alkali Ferrates", Japanese Kokai No. 80/75926, published on June 7, 1980].

Potassium ferrate is a strong oxidizing agent and it readily degrades or reacts in many ways. For example, it quickly degrades in aqueous solutions to produce ferric hydroxide according to the reaction of following Equation (A):

$$4K_2FeO_4 + 10H_2O \rightarrow 4Fe(OH)_3 + 8KOH + 3O_2 \qquad (A)$$

While the rate of this decomposition becomes lower with an increase in alkalinity, the Fe(OH)3 produced has a catalytic effect on this decomposition reaction. Thus, the decomposition of the ferrate ion (FeO4−2) is greatly promoted in the presence of certain amounts of ferric hydroxide. However, this Fe(OH)3 produced also has useful functions, including acting as an absorbent.

It is also known that the presence of very small amounts of certain metal impurities (e.g. nickel and cobalt) and organic impurities causes the degradation or decomposition of ferrate(VI) ions, even in strongly alkaline solutions [see Ettel et al., "Reactions of Very Pure Substances (V)—Ferrate Decomposition in Alkaline Solution", *Collection Czechoslov. Chem. Commun.,* Vol. 34, pages 2182 to 2188 (1969)].

Still further, it is known that a large excess of reactants (e.g. Cl2) or co-products of ferrate formation [e.g. H2O, KCl, Fe(OH)3] cause an acceleration of the decomposition of ferrate(VI) ions in solution [see Schreyer et al., "Stability of Ferrate(VI) Ion in Aqueous Solution", *Anal. Chem.,* 23, No. 9, pages 1312, 1314 (September 1951)]. Thus, it can be strongly suspected that such degradation problems, among others, have prevented the commercial production of potassium ferrate.

Among the above-noted four general methods for making potassium ferrate, it appears that the second hypohalite/ferric salt technique (where $K_2FeO_4$ is made in one step from KOH) is economically and practically advantageous over the other three methods. The direct electrolysis method is impractical for continuous operation because of passivation of the iron anode, which causes an increase in voltage and a decrease in ferrate production. Also, the iron anide is sacrificed and would need to be replaced (resulting in process shutdown). Furthermore, the yields of this technique are small. The iron/potassium nitrate fusing method requires high temperatures (and much energy to reach those temperatures) to accomplish its desired result. The yields of this reaction are also small. The two-state hypohalite/ferric salt reaction with a $Na_2FeO_4$ intermediate has commercial disadvantages, namely, it requires extra steps; it forms undesirable sodium impurities as a by-product in the first stage; and it results in a mother liquor comprising a mixture of NaOH and KOH solutions, whose reuse is difficult.

Because potassium ferrate appears to be relatively environmentally safe and offers great potential as an oxidizer in a variety of applications, there is a great need to find an improved process which makes $K_2FeO_4$ readily and economically. It is believed that the present invention is a solution to that need.

BRIEF SUMMARY OF THE INVENTION

Accordingly, the present invention is directed to a process for preparing potassium ferrate, which comprises:

(1) reacting a membrane cell-grade aqueous KOH solution with substantially pure $Cl_2$ and substantially pure ferric salt in the presence of a stabilizing proportion of at least one ferrate-stabilizing compound to form a reaction mixture comprising a first liquid phase comprising $H_2O$, KOH, and KOCl and a first insoluble phase comprising stabilized $K_2FeO_4$, KCl, and $Fe(OH)_3$; and (2) separating and recovering the potassium ferrate from said reaction mixture.

Advantageously and preferably, the potassium ferrate may be separated and recovered from the reaction mixture by the following steps:

(a) adjusting the KOH concentration of the reaction mixture to at least 30% by weight;

(b) separating the first insoluble phase from the first liquid phase;

(c) adding the separated first insoluble phase to a sufficient amount of an aqueous KOH solution, said solution having a KOH concentration from about 5% to about 25% by weight, to solubilize at least a major portion of the stabilized $K_2FeO_4$, thereby forming a second liquid phase comprising KOH, $H_2O$, and at least a major portion of the stabilized $K_2FeO_4$ and a second insoluble phase comprising at least a portion of the KCl and $Fe(OH)_3$;

(d) separating said second liquid phase from said second insoluble phase;

(e) adding a sufficient amount of KOH to the separated second liquid phase to precipitate at least a portion of the stabilized $K_2FeO_4$; and (f) separating and recovering the precipitated, stabilized $K_2FeO_4$ from the separated second liquid phase.

Further advantages of this present invention are explained in other preferred embodiments discussed below.

BRIEF DESCRIPTION OF THE DRAWING

The FIGURE shows a detailed flow chart of a preferred continuous method for making and purifying potassium ferrate economically.

DETAILED DESCRIPTION

The reaction of step (1) above of the present invention can be illustrated by the following Equations (B), (C), (D), and (E) wherein $FeCl_3$ is used as the ferric salt:

<u>FORMATION OF KOCl IN-SITU</u>

$$2KOH + Cl_2 \longrightarrow KOCl + KCl + H_2O \quad (B)$$

<u>FORMATION OF INTERMEDIATE $Fe(OH)_3$</u>

$$FeCl_3 + 3KOH \longrightarrow Fe(OH)_3 + 3KCl \quad (C)$$

<u>REACTION OF $Fe(OH)_3$, KOCl AND KOH</u>

$$2Fe(OH)_3 + 3KOCl + 4KOH \longrightarrow 2K_2FeO_4 + 3KCl + 5H_2O \quad (D)$$

<u>OVERALL SUM OF EQUATIONS (B), (C), AND (D)</u>

$$2FeCl_3 + 16KOH + 3Cl_2 \longrightarrow 2K_2FeO_4 + 12KCl + 8H_2O \quad (E)$$

REACTANTS

As can be seen from the above equations, potassium ferrate is made according to the present invention by the reaction of a ferric salt, $Cl_2$ and KOH through the reaction intermediates KOCl and $Fe(OH)_3$.

Any ferric compound [Fe(III)] capable of producing $Fe(OH)_3$ in a basic hypochlorite solution may be employed herein. Ferric(III) salt may be made from iron-containing ores, minerals, metals, industrial effluents, or other iron-containing substances.

One method of preparation is to react iron metal, scrap iron, steel or iron oxides such as magnetite ($Fe_3O_4$) or hematite ($Fe_2O_3$) with an acid to form the corresponding ferric salt and $H_2$ gas or $H_2O$. Then, the ferric salt is removed from the acid and dried. Other sources of ferric salts include by-products of other manufacturing processes. For example, ferric salts may be obtained from the effluent streams of titanium dioxide plants, mining processes, steel pickling plants, pyrite oxidation, and the like.

It is required that the ferric salt employed in the process of the present invention be "substantially pure". The term "substantially pure ferric salt" as used in the present specification and claims is defined as a ferric salt which contains no more than 200 parts per million parts (ppm) by weight of harmful metallic impurities and organic impurities in total which may cause or catalyze decomposition reactions of $K_2FeO_4$. Preferably, the preferred amount of impurities is less than about 100 parts per million parts of impurities in total. The overall level of undesired metallic and organic impurities in the ferrate reaction step and the following process steps and streams during operation should be maintained on an average basis at less than about 20 ppm, preferably less than about 10 ppm, of the total reaction mixture. Thus, the purity of the ferric salt added must meet this additional requirement. The undesired metal impurities, as now known, are ferrous ions [Fe(II)], nickel, cobalt, molybdenum, mercury, vanadium, chromium, ruthenium, platinum, palladium, osmium, rhodium, and iridium. The undesired organic impurities are defined herein as any organic compound capable of being readily oxidized by hypochlorite or ferrate ion. This includes alcohols or hydrocarbons or the like. Ferric salts may be purified by any conventional processes including sublimation, distillation, crystallization, and the like.

The anion of the ferric salt is preferably a KOH-soluble and KOCl-soluble anion such as chloride, sulfate, or nitrate. It is also preferable that the salt be in an anhydrous state or in a freshly prepared aqueous solution when employed in the ferrate reaction. Adding these forms of ferric salts prevents the formation of undesired passive iron-oxygen polymer-like chains (e.g., —Fe—O—Fe—O—Fe—) which are relatively unreactive when preparing ferrates. It is more preferred to use an anhydrous salt since water is then not introduced with the ferric salt to the reactor. Excess water may cause decomposition of ferrate product in the ferrate-forming step or in the later separation steps.

Preferred ferric salts are $FeCl_3$, $Fe(SO_4)_3$, and $Fe(NO_3)_3$ because of their KOH and KOCl solubilities, their wide-spread availability and ease of use. $FeCl_3$ is the most preferred because the chloride anion may be recycled as KCl back to the $Cl_2$ source, namely, a membrane-type chlor/alkali cell. $FeCl_3$ is also favored because it is available in highly pure forms (e.g., through sublimation processes). It is noted that prior art processes favored the use of $Fe(NO_3)_3$ as the iron-containing reactant [see Thompson et al., *J. Am. Chem. Soc.*, 73, 1379–1381, (1952) and Williams et al., *Inorganica Chemica Acia.*, 8, 177–183 (1974)]; but because the nitrate anion is not readily recycled by the process of the present invention, $Fe(NO_3)_3$ is not the most preferred reactant.

Anhydrous, highly pure ferric salts may be added directly to the ferrate reaction, or added in a slurry with an aqueous KOH solution. In the latter case, the ferric salt may be converted to $Fe(OH)_3$ before the ferrate reaction. However, it is within the scope of the present invention to do this as long as the $Fe(OH)_3$ is freshly prepared. Of course, the need for a substantially pure reactant also holds true for freshly prepared ferric hydroxide.

It should also be understood that the terms "$Fe(OH)_3$" and "ferric hydroxide" as used in the ferrate art and as used herein include other ferric oxyhydroxide species besides the named compound. For instance, it is desired herein that freshly prepared $Fe(OH)_3$ be used as a reactant or reactant intermediate (see Equations C and D, above). In that case, similar low molecular weight ferric oxy-hydroxide species should be included in the definition. However, the same term, as used in the ferrate art and herein, sometimes refers to higher molecular weight polymeric gels which either form after longer exposure of ferric ions in alkaline solutions or as the products of ferrate degradation. Because these other ferric oxy-hydroxide species are difficult, if not impossible, to completely analyze for, this distinction in meaning of "$Fe(OH)_3$" and "ferric hydroxide" should be remembered.

The process of the present invention also requires membrane cell-grade aqueous KOH solutions to avoid the catalytic degradation of the potassium ferrate product. The term "membrane cell-grade aqueous KOH solutions" is defined herein as containing less than 10 parts per million (ppm) parts, preferably 3 parts per million parts, by weight of total harmful metallic and organic impurities as defined above. However, as stated above, the overall level of undesired metallic and organic impurities in the ferrate reaction step and the following process steps during operation should be maintained, on an average basis, at less than about 20 ppm, preferably less than about 10 ppm, of the total reactant mixture. Thus, purity of the KOH added must help meet this additional requirement. Such highly pure KOH solutions may be consistently made in membrane-type chlor/alkali electrolysis cells which employ a perfluorosulfonate, carboxylate, or similar material as a cation exchange membrane separating the anolyte and catholyte compartments of the cell. Membrane-type chlor-alkali cells produce much purer KOH and $Cl_2$ than diaphragm, mercury, or other types of cells that were previously used. Diaphragm-type cells and mercury-type cells frequently produce KOH and $Cl_2$ products having appreciable contamination of total metal ions and organics at above 20 parts per million (ppm) by weight level and therefore cannot be employed herein with the same assurance. Occasionally, large pulses of undesired impurities also occur in these systems, which could create a catalytic degradation of one or more of the ferrate process streams. Of course, if KOH solutions from these latter types of electrolysis cells are purified or otherwise treated for removal of undesired impurities, these types of KOH may also be utilized. Such purifications are technically feasible but are thought to be uneconomical.

Highly pure reactants improve not only product yields and product purity, they also prevent the $K_2FeO_2$ product from degrading because the presence of trace amounts of impurities will catalyze degradation reactions. Also, the use of highly pure reactants will improve the stability of the overall process.

The concentration of the KOH added to the reactor should be as high as possible to keep water from possibly interfering with the formation of $K_2FeO_4$ or possibly degrading the $K_2FeO_4$ and to allow the formed $K_2FeO_4$ to precipitate from the KOH solution. Generally, it is necessary to add aqueous KOH solutions having concentrations from about 25% by weight up to saturated KOH solutions (about 55% by weight at 40° C.). More preferably, the KOH concentration of the solution added to the reactor is from about 33% to at least about 50% by weight. The pure KOH solution is added directly to the ferrate reactor, or is evaporated to increase its concentration before addition to the tank. If desired, it is, of course, possible to add KOH slurries or solids to the reactor having concentrations from about 55% to 100% by weight. This option may be helpful in reducing excess water present in the process streams.

The third reactant required for the present process is substantially pure $Cl_2$. Normally, $Cl_2$ produced by membrane-type chlor/alkali cells is very pure, and the term "substantially pure chlorine" is defined herein to have the same limits of impurities as the above-defined "membrane cell-grade aqueous KOH solutions". An example of one advantageous method for insuring the purity of the chlorine gas reactant is by scrubbing, spraying, or otherwise contacting the chlorine gas with at least one chlorine-insoluble aqueous acid, e.g., electronic grade $H_2SO_4$ of high concentration such as at least 70% $H_2SO_4$. Preferably, this step is accomplished immediately preceding addition to the ferrate reactor.

The chlorine gas, when added to the ferrate reaction mixture, dissolves continuously and reacts with KOH to form KOCl. However, a large excess of chlorine gas should be avoided since large quantities of by-product salt (e.g., KCl) is produced, reaction temperature can rise very high, and alkalinity is reduced. All of these conditions can decompose $K_2FeO_4$ and should be avoided.

It should also be noted that the present invention may be carried out with $Br_2$ instead of $Cl_2$. In that case, a bromo/alkali membrane cell would be used and KOBr would be formed as the reactive intermediate. Of course, since $Cl_2$ is generally more economical to use, it is favored.

FERRATE STABILIZERS

Besides the use of substantially pure reactants, the process of the present invention requires the presence of a stabilizing proportion of ferrate-stabilizing compounds during the ferrate formation reaction. Potassium ferrate is a very strong oxidizer and, as mentioned above, the presence of certain metallic and organic impurities, may cause degradation of the product. Furthermore, potassium ferrate will degrade because of reactions with precursors and co-products. It now has been found that one or more ferrate-stabilizing compounds may be added directly during the ferrate-forming reaction in order to greatly diminish the decomposition of potassium ferrate.

There have been investigations in the past to find stabilizers to retard or stop the decomposition of potassium ferrate [see J. Schreyer et al., "Stability of Ferrate(VI) Ion in Aqueous Solution", *Anal. Chem.*, Vol. 23, No. 9, pages 1312-1314 (September 1951); Wagner, Gump and Hart, "Factors Affecting the Stability of Aqueous Potassium Ferrate(VI) Solutions", *Anal. Chem.*, Vol. 24, pages 1497-1498 (1952); and Mills et al., "Stabilization of Ferrates", U.S. Pat. No. 2,758,090, which issued on Aug. 7, 1956]. In particular, it was found that phosphate ion buffers, ortho-phosphates, meta-phosphates, cyclictriphosphates, and tetra-phosphates (but not pyrophosphates) stabilized aqueous solutions of potassium ferrate. Potassium sulfate, sodium carbonate, and sodium borate have been found to slow decomposition reactions [see J. M. Schreyer, "Higher Valence Compounds of Iron", Ph.D. Thesis at Oregon State Univ., page 14 (1948)]. Periodate is also a known ferrate stabilizer [see J. C. Bailer et al., *Comprehensive Inorganic Chemistry*, Vol. 3, Pergamon Press Ltd., pages 1049-1051 (1973)].

The ferrate-stabilizing compounds which have been found to be useful for the purpose of the present invention include the alkali metal (e.g., sodium and potassium) salts of iodide ($I^-$), iodate ($IO_3^-$), meta-periodate ($IO_4^-$), para-periodate ($IO_6^{-5}$ or $H_2IO_6^{-3}$) elemental iodine ($I_2$); alkali metal silicates (e.g., $mNa_2O \cdot nSiO_2 \cdot pH_2O$ where the ratio of n to m is from about 0.1:1.0 to 5:1 and p is 0 to 24); borates ($BO_4^-$); permanganates ($MnO_4^-$); sulfates ($SO_4^{-2}$); phosphates ($PO_4^{-3}$); chlorates ($ClO_3^-$); bromate ($BrO_3^-$); perchlorates ($ClO_4^-$); perbromates ($BrO_4^-$); and metal complexes of the above salts where the metal is copper, gold, or silver. The ferrate-stabilizing compounds may be added in stabilizing proportions to the reaction mixture. Preferably, they are very soluble in KOH solutions so they will not be removed with KCl and $Fe(OH)_3$ solids after the reaction step. The stabilizers preferably will remain in the process streams of the present invention at a constant level, and will be recycled throughout the process, thus requiring very little replenishment. Those impurities which are bound by silicates or other ferrate-stabilizing compounds may become insoluble and will preferably be removed with the solid KCl and $Fe(OH)_3$ after the reaction step; hence, those types of ferrate stabilizers may need to be replenished.

As a preferred embodiment of the present invention, it has also been found that the combination of an alkali metal silicate, an alkali metal iodine-containing salt, and a cupric(II) salt is a very effective stabilizer. Any suitable alkali metal silicate or iodine-containing salt may be used in this invention such as sodium or potassium silicates or iodine-containing salts. The preferred alkali metal silicate is sodium metasilicate pentahydrate. The preferred alkali metal iodine-containing salt is sodium periodate. The preferred cupric(II) salt is either anhydrous or hydrous cupric(II) chloride.

Such alkali metal silicate stabilizers, in addition to stabilizing potassium ferrate, may have other beneficial effects to the process of the present invention. These benefits may include the following:

(1) buffering the alkalinity of the reactor contents and, thus, allowing more flexibility as to the amounts and concentrations of KOH which may be added to the reactor;

(2) improving the wetting characteristics of the reactor contents and, thus, providing better flow properties to the process streams;

(3) improving the suspension and deflocculating of the solid Fe(III) salt reactant and, thus, providing more homogeneous mixing of the reaction mixture slurry in the reactor and minimizing dead spots and plugging of the process equipment;

(4) improving the pourability, filtering characteristics, and handling of potassium ferrate crystalline precipitates on large operating scales;

(5) tying up certain impurities in the reaction mixture such as trace amounts of heavy metals and alkaline earths; and (6) preventing corrosion of processing equipment.

The alkali metal iodine-containing salt may have $I^-$, $IO_3^-$, $IO_4^-$, or $H_2IO_6^{-3}$ as anions. Each of these first three anions will form $H_2IO_6^{-3}$ or $H_2I_2O_{10}^{-4}$ in situ when put in hypochlorite solution. For example, alkali metal iodine-containing salts such as KI, NaI, $KIO_3$, $NaIO_3$, $KIO_4$, and $NaIO_4$ form the corresponding alkali metal para-periodate in situ (e.g., $K_3H_2IO_6$ or $Na_3H_2IO_6$) when put into a hypochlorite solution. It is not exactly known how the periodate ion acts as a stabilizer, but it is believed that it prevents the reaction of potassium ferrate with $H_2O$ or is itself reacted with impurities which have not been sequestered by the silicate stabilizer.

It is also preferred to use copper, gold, or silver, or salts thereof (in the +1, +2, or +3 oxidation state) if other ferrate stabilizers are used. These three metals appear to complex with the other stabilizers; and such complexes seem to increase ferrate ion stability, while increasing the rate of ferrate-forming reaction. Because of cost, copper and its salts are most preferred. Of course, copper, gold, or silver may be complexed with other stabilizers first and the complexes may be added to the ferrate reaction.

FERRATE REACTION PARAMETERS

The three reactants may be added to the ferrate reactor in any order. Preferably, at least a portion of the KOH is added to the reactor first because it also acts as solvent for the reaction. Gaseous or liquid $Cl_2$ is then preferably bubbled or added through the liquid reaction mixture by any conventional means. The solid ferric salt or liquid ferric salt solution is then added by any conventional means. The rates of addition of all three reactants should be monitored as explained below. Likewise, the ferrate stabilizers should be added simultaneously with the ferric salt and their rate of addition monitored by conventional means. Also, chlorine is favored as the oxidizing agent over hypochlorite because it appears chlorine reacts faster, is easier to use in a continuous process, and requires no extra preliminary steps to make.

To start up a continuous process for making potassium ferrate as illustrated in the FIGURE, the KOH and $Cl_2$ are made in a chlor/alkali membrane-type electrolysis cell and sent directly to the ferrate reactor. The ferric salt and ferrate stabilizers are also added directly to the reactor. After the continuous process for making ferrates has been started up, it is advantageous to recycle unused KOH and unreacted KOCl along with a portion of stabilizer employed back to the reactor from processing steps after the reaction.

Accordingly, the rates of addition of the reactants and stabilizers from such recycled streams should also be monitored and their amounts considered in the overall amounts present in the ferrate reactor.

The mole ratio of the reactants added to the reactor may be generally from about 1.5:1 to about 30:1 moles of $Cl_2$ added to ferric salt added and from about 10:1 to about 60:1 moles of KOH added to ferric salt added. The preferred mole ratios are from about 2:1 to about 15:1 moles of $Cl_2$ to ferric salt and from about 15:1 to about 30:1 moles of KOH to ferric salt added. The use of smaller molar ratios of $Cl_2$ to ferric salt or KOH to ferric salt may result in lower product yields, while the use of larger molar ratios may necessitate the need for larger recycle streams back to the reactor and non-use of large amounts of unreacted KOH or KOCl, or both. Also, the use of larger mole ratios of $Cl_2$ may cause degradation reactions.

In one preferred embodiment of the present invention, it is desirable to add the KOH in more than one stage in the reactor or add more KOH immediately following the reaction step. Specifically, it is preferred to keep the KOH concentration in the first stage of the reaction at levels from about 20% to about 40%, more preferably, from about 25% to about 35%, by weight of the reaction mixture. It is believed that these KOH concentrations are more suitable for the KOCl formation and subsequent $K_2FeO_4$ formation reactions. However, at these KOH concentrations, an appreciable amount of $K_2FeO_4$ would be soluble and could not be readily recovered with solids separation and recovery discussed below. Accordingly, it is desirable to adjust the KOH concentration upward to at least about 30%, preferably from about 35% to about 50%, by weight of the reaction mixture. This adjustment of KOH concentration ensures that a minimum amount of $K_2FeO_4$ will remain soluble in the reaction mixture, thus resulting in the recycling of minimum amounts of product.

The stabilizing proportion of stabilizers added to the reactor will depend upon the particular stabilizer or mixtures thereof added; the amount of potassium ferrate made in the reaction mixture; the amount of reactants employed; and other factors. The amount should be sufficient in order to keep a substantial amount (i.e., more than 75% of the theoretical amount) of the potassium ferrate formed from degrading in the reactor and during the purification process. In the case of using the combination of an alkali metal silicate, an alkali metal iodine-containing salt, with or without a Cu(II) salt, it is preferred to use the silicates in amounts from about 0.01% to about 1% by weight, more preferably, from about 0.05% to about 0.5%, of the reaction mixture present in the reactor and to use the iodine-containing salts in amounts from about 0.01% to about 0.2% by weight, more preferably, from about 0.04% to about 0.1%, of the reaction mixture in the reactor. It is preferred to use copper(II) salts in amounts from about 0.001% to about 0.05% by weight, more preferably, from about 0.003% to about 0.04%, of the reaction mixture in the reactor. However, it should be noted that Cu, Au, or Ag should be employed only when stabilizers which complex with these metals are also present.

It is preferred in some instances to use an iodine-containing salt with a copper(II) salt. The mole ratios of such complexes would contain from about 2:1 to about 100:1 moles, more advantageously, from about 5:1 to about 20:1 moles, of the iodine-containing salt to the cupric(II) salt.

The reactor temperature should be kept between about 0° C. and about 50° C. in order to ensure the formation of potassium ferrate in good yields and without product degradation. Preferably, the reaction temperature may be kept from about 10° C. to about 45° C., and, more preferably, it may be kept in the range from about 20° C. to about 40° C. for better yields and less chance of degradation. The reactor should be equipped with a cooling means such as a cold water jacket to maintain such temperatures.

The preferred reactor pressure is atmospheric pressure because of cost, although the use of super-atmospheric or sub-atmospheric pressure may be suitable in some instances.

The average residence time of the potassium ferrate formed in the reactor should be short in order to avoid possible degradation by reactions with either the by-products, KCl and $H_2O$; the reactant, $Cl_2$; or the reaction intermediates, KOCl and $Fe(OH)_3$. Preferred average residence time of $K_2FeO_4$ in the reactor is less than about 300 minutes; more preferably, less than about 180 minutes. Rapid removal of $K_2FeO_4$ from the reaction mixture reduces the possibility of the product being degraded.

The resulting reaction mixture, upon leaving the reactor, should preferably contain about 1% to about 10% by weight, more preferably about 2% to about 6% by weight, of potassium ferrate. It is believed that reaction mixtures containing less than about 1% by weight $K_2FeO_4$ would be uneconomical to purify, and mixtures containing more than about 6% by weight $K_2FeO_4$ will start to encounter degradation problems.

SOLIDS SEPARATION STEP

As stated above, the reaction mixture leaving the ferrate reactor is comprised of a liquid portion and a solids (or insoluble) portion. The liquid portion contains unreacted KOH, unreacted KOCl, $H_2O$, a small amount of soluble KCl, and the small portion of the $K_2FeO_4$ product which is soluble in the $KOH/H_2O$ reaction mixture. The solids phase is comprised of solid $K_2FeO_4$ product along with any of the unreacted intermediate $Fe(OH)_3$ and the insoluble by-product KCl.

If not done within the reactor, the KOH concentration of the reaction mixture is preferably increased to at least about 30%, more preferably from about 35% to about 45%, by weight of the reaction mixture. This adjustment of KOH concentration will decrease the amount of $K_2FeO_4$ in the liquid portion and, thus increase the amount in the insoluble portion. Furthermore, it may be advantageous to lower the temperature of reaction mixture to about 5°–20° C. in order to further maximize the formation of solid $K_2FeO_4$.

The solids portion of the reaction mixture, along with a small amount of liquids entrapped in the solids, may be separated from the liquid portion by any conventional solids/liquid separation technique. Centrifuging and filtration are preferred methods. Centrifuging is more preferred because higher product yields may be achieved and less time is needed. This solids/liquid separation should be accomplished immediately (e.g., within 5 minutes) upon the reaction mixture leaving the ferrate reactor in order to prevent decomposition of the ferrate product.

The separated solids portion is then transferred to a $K_2FeO_4$ dissolving step. The separated liquids portion may be disposed of or recycled back to the ferrate reactor for further reaction of the KOH. It is desirable to remove at least a portion of the $H_2O$ present in the liquid portion before recycling back to the reactor to prevent the build-up of undesirable water in the reactor. This removal of by-product and excess water may be accomplished by lower temperature (e.g., 10° C. to 40° C.) vacuum evaporation.

POTASSIUM FERRATE DISSOLVING STEP

Since the $K_2FeO_4$ is combined with KCl and Fe(OH)$_3$ in the solids portion of the reaction mixture, it is necessary to separate $K_2FeO_4$ from these two impurities. Since $K_2FeO_4$ is relatively soluble in dilute aqueous KOH solutions, while KCl and Fe(OH)$_3$ remain more insoluble, this separation may be accomplished by adding the insoluble portion of the reaction mixture to a dilute aqueous KOH solution. Generally, KOH concentrations from about 5% to about 25% may be employed. More preferably, from about 10% to about 20% by weight are used.

The liquids and solids during this dissolving step are preferably kept at a relatively warm temperature (e.g., 20° C. to 50° C.) in order to maximize separation of soluble $K_2FeO_4$ in the KOH from the remaining insolubles in the next step. Also, it may be desirable to add ferrate stabilizers during this step.

KCl and Fe(OH)$_3$ SEPARATION STEP

The insolubles, comprising mainly KCl and Fe(OH)$_3$, are next separated from the liquid phase, comprising mainly KOH and $K_2FeO_4$, by any conventional solids/liquid separation technique. Filtration or centrifuging are preferred methods. Centrifuging is more preferred for continuous production of $K_2FeO_4$. The KCl and Fe(OH)$_3$ are returned to a membrane cell brine treatment where the KCl is purified for use in an electrolysis step whereby KOH and $Cl_2$ may be made. The Fe(OH)$_3$ may be disposed of or reprocessed for reuse in the ferrate reactor. Any insoluble silicate-bound or other insoluble impurities are returned to the brine purification system with the KCl and Fe(OH)$_3$ and are disposed of or reprocessed.

$K_2FeO_4$ PRECIPITATION STEP

After a major portion of the KCl and substantially all of the Fe(OH)$_3$ were preferably separated from the $K_2FeO_4$/KOH solution, it is desired to separate the $K_2FeO_4$ from the aqueous KOH solution. This can be easily accomplished by combining this relatively dilute KOH solution with a very concentrated KOH solution (i.e., an aqueous solution containing from about 40% to about 55% by weight KOH) or a more concentrated KOH slurry or solid. When the resulting mixture has a sufficient concentration of KOH (i.e., at least about 30% by weight), crystals of $K_2FeO_4$ will precipitate; however, most of the remaining KCl would remain in solution [see Thompson et al., *J. Am. Chem. Soc.*, Vol. 73, pages 1379–1381 (March 1951)] because of their differences of solubility. This $K_2FeO_4$ crystallization and precipitation may be aided by other means such as cooling the solution during this KOH saturation step, adding nucleating seeding crystals of $K_2FeO_4$ or stabilizers, or employing vacuum evaporation. Solution temperatures in the range from about $-20°$ C. to 20° C. are preferred. The cooling may be done by any conventional means.

$K_2FeO_4$ RECOVERY STEPS

After the $K_2FeO_4$ crystals are precipitated, they may be separated from the aqueous KOH solution by any conventional solids/liquid separation technique. Again, filtration and centrifuging are the preferred methods, with the latter being more preferred for continuous operation.

The separated aqueous KOH solution may be disposed of, recycled to the ferrate reactor or another step in this process, or both. Because the concentration of this separated KOH solution is relatively high (i.e., above about 30% by weight) it may be used to adjust the KOH concentration upward in the ferrate reactor or immediately thereafter.

The separated crystals of $K_2FeO_4$ may be employed for the above-noted uses or further purified. Since these crystals may have some KOH, $H_2O$, and possibly KCl entrapped in their structures, it is preferred that they be further purified. Any suitable purification procedure, or combinations thereof, may be utilized to remove impurities, and thereby prevent decomposition reactions from occurring and increase the stability of the $K_2FeO_4$ product.

It has been found that preferred organic solvents for such washing steps include sulfoxides such as dimethylsulfoxide (DMSO), diethylsulfoxide, dibenzosulfoxide, dimethylsulfone, sulfolane (tetrahydrothiophene 1,1-dioxide) and alcohols such as methanol, ethanol, isopropanol, and sec-butanol. It is important that substantially anhydrous solutions of organic solvents be used (i.e., no more than 1% by weight $H_2O$ present for the sulfoxides and the like and no more than 0.1% for alcohols). Aqueous solutions of organic solvents are not suitable because the $H_2O$ will cause decomposition of the potassium ferrate. It should also be realized that prolonged contact between the $K_2FeO_4$ and the organic solvents is not desirable since a strong oxidizer like $K_2FeO_4$ will eventually react with relatively inert compounds like the abovementioned solvents. And, of course, the organic solvents, like the reactants, should be substantially free of any harmful metallic and organic impurities which might initiate ferrate decomposition reactions.

It is appreciated that the prior art has employed a benzene wash, followed by an ethanol wash, to purify $K_2FeO_4$ [see R. J. Audette et al., *Inorganic Chemistry*, Vol. 11, No. 8, pages 1904–1908 (1972)], but benzene has been found to be environmentally unacceptable in some instances. Instead, one of the more preferred embodiments of the present invention encompasses the use of anhydrous DMSO to first wash the impure crystals of $K_2FeO_4$ followed by washing with anhydrous methanol. The DMSO wash will break up the potassium ferrate-containing solids and solubilize impurities in the $K_2FeO_4$ crystals, especially $H_2O$. Methanol is better than DMSO for solubilizing and removing KOH from the crystals, but the presence of small amounts of water may cause the $K_2FeO_4$ to oxidize methanol rapidly to formaldehyde.

The preferred method of washing the $K_2FeO_4$ with the organic solvents is to simply add the $K_2FeO_4$ crystals to an organic solvent bath and allow sufficient contact time for impurities to solubilize and separate from the $K_2FeO_4$ crystals. Leaching, extraction, or other suitable processing equipment, preferably with agitation to increase the rate of dissolving impurities, may be useful for this purification process. After this contact time has passed, the $K_2FeO_4$ crystals may be removed from the solvent by a conventional liquid/solids separation technique such as centrifuging.

After the $K_2FeO_4$ has been washed with organic solvents, it may be dried to remove remaining organic solvents by any suitable chemical drying procedure including vacuum evaporation; washing with ether; or with a tray, drum, or rotary dryer; or combinations thereof. It has been found that $K_2FeO_4$, following the extraction with DMSO and methanol, may be dried at atmospheric pressure at higher temperatures, from about 50° C. to 100° C. This result will allow use of ordinary heated tray, drum, or rotary dryers, avoiding vacuum or low-temperature evaporation with their greater expense or longer drying times.

The dried solid $K_2FeO_4$ product may be used immediately or stored in air-tight containers for future use.

PRODUCT DESCRIPTION

Dry potassium ferrate is black-violet powder and has a thermal degradation temperature at about 200° C. It is very soluble in water, giving a blood-red solution. Water solutions of potassium ferrate will decompose upon standing, evolving oxygen and giving potassium hydroxide and ferric hydroxide. $K_2FeO_4$ is stable in highly alkaline solutions at low concentrations and temperatures below about 50° C.

Stability tests of dry potassium ferrate products as described in the Examples below have shown no appreciable loss of activity of a 94% by weight $K_2FeO_4$ product in over 6 weeks of closed-container storage at room temperature.

Other stability tests of 0.0001 to 0.0002 Molar $K_2FeO_4$ in aqueous solutions (with a pH of about 11 to 12) are described below which indicate that the joint use of an alkali metal iodine-containing salt such as sodium para-periodate, an alkali metal silicate such as sodium meta-silicate pentahydrate, and a Cu(II) salt such as $CuCl_2$ in the presence of hypochlorite offer superior stabilization to ferrate-containing aqueous solutions.

Still other stability tests of potassium ferrate reactor slurries are described below which indicate the superior process stream stability of $K_2FeO_4$-containing having one or more ferrate stabilizers present.

PREFERRED CONTINUOUS PROCESS

A preferred embodiment of the present invention is the continuous process shown in the FIGURE. Generally, the continuous production of potassium ferrate by this process will provide about 60% to about 90% by weight single-pass conversions in the ferrate reactor. Single-pass recovery of a solid $K_2FeO_4$ product by this process will be usually from about 25% to about 60% by weight of the theoretical as based on the amount of ferric salt employed in the ferrate reactor. However, a great advantage of this aspect of the present invention is that substantially all of the unrecovered product may be recycled back to the ferrate reactor and eventually recovered.

Referring to the FIGURE, ferric salt, chlorine gas, an aqueous KOH solution, and at least one ferrate-stabilizing compound are all added to the ferrate reactor to make potassium ferrate and the by-products $H_2O$ and KCl. The ferrate reactor must be made of material resistant to attack by the reactants or products, either singly or in combination. Polypropylene, polyethylene, polyvinyl chloride, or fluorocarbon plastics may be suitable. The reactor should have a cooling means attached to it to maintain the reaction temperature in the range from about 0° C. to about 50° C. The reactor may be equipped with suitable agitation means such as mechanical agitators.

The reaction parameters should be in the ranges stated above. In addition, the potassium hypochlorite concentration in the reactor is also preferably monitored and preferably maintained in the range of from about 12% to about 16% by weight of the total reaction mixture.

During start-up of the continuous process, an aqueous KOH solution is preferably added to the reactor first. Then chlorine gas is added until continuous levels of KOCl and KOH in the above-noted ranges are achieved. Then the ferric salt (e.g. $FeCl_3$) is added with the ferrate-stabilizing compounds until the potassium ferrate concentration is brought up to about 3.5–5.0% by weight of the total reaction mixture in the reactor. Then continuous production will begin using the separation and recovery steps outlined on the FIGURE.

As indicated in the FIGURE, the chlorine gas and an aqueous KOH solution are preferably added during the start-up from a membrane-type chlor/alkali electrolytic cell. This type of electrolytic cell is well known and is described in U.S. Pat. Nos. 4,233,122 and 4,253,923, both of which issued to Lynch, Hilliard, and Dotson on Nov. 11, 1980, and Mar. 3, 1981, respectively.

Electrolytic cells employed in this invention may be a commercially available or a custom built membrane-type electrolytic cell of a size and electrical capacity capable of economically producing the desired $Cl_2$ and KOH reactants. The electrolytic cell should be constructed of any material resistant to strong bases and strong oxidant chemicals. It may be desirable to line the inside surfaces of the cell with a plastic material resistant to KOH solutions and $Cl_2$ or the cell may be constructed entirely of plastic material.

A particularly advantageous membrane-type electrolytic cell which may be employed in the practice of this process has separate anolyte and catholyte chambers, using a permselective cation exchange membrane as a separator. Located on one side of the membrane partition, the anolyte chamber has an outlet for any chlorine gas generated, and an inlet and an outlet for charging, removing, or circulating the KCl anolyte. On the opposite side of the membrane partition, the catholyte chamber has inlets and outlets for the potassium hydroxide solution and an outlet for hydrogen liberated at the cathode by the electrolysis of water.

Electrolytic cells employed in the present invention may be operated on a batch or flow-through system. In the latter system, either anolyte or catholyte, or both, may be continuously circulated to and from external solution storage vessels.

As also indicated in the FIGURE, the ferric salt is supplied from any suitable iron source such as scrap iron, steel, or the like. The iron source is converted and purified to a substantially pure ferric salt by conventional methods mentioned above. It is important that the ferric salt be added to the ferrate reactor simultaneously or after the addition of a stabilizing amount of ferrate-stabilizing compound or compounds. This simultaneous addition may prevent ferrate decomposition from being initiated.

When the potassium ferrate product reaches the desired concentration in the reactor, the reaction mixture is continuously removed from the reactor. The reaction mixture is comprised of a liquid/solid slurry containing $K_2FeO_4$, KCl, $H_2O$, KOH, stabilizing additives, and the reaction intermediates, ferric hydroxide and KOCl. As discussed above, the KOH concentration in the reaction mixture is preferably increased to at least 35% KOH by weight and is also preferably cooled to at least 20° C.

The liquids portion of the removed reaction mixture should be separated from the solids portion as soon as possible to remove undesirable amounts of water from the solids in which is the $K_2FeO_4$ product. This separation is preferably accomplished by filter-type centrifugation.

The separated liquids portion of the reaction mixture may be recycled back to the ferrate reactor. This liquids portion contains unreacted KOH, KOCl, and water, along with small amounts of $K_2FeO_4$, which is soluble in this liquids portion. This soluble $K_2FeO_4$ is therefore not lost. Because there will be a build-up of $H_2O$ in the process (due to water entering from the aqueous KOH solution as well as the water formed as a by-product), it may be necessary to purge the water from this and other recycle streams. These water purges (shown in the FIGURE) may be accomplished by vacuum evaporation at temperatures under about 50° C. or by other suitable methods.

The separated solids portion is transferred to a potassium ferrate dissolving tank containing a relatively low concentration (i.e., from about 10% to about 20%) of an aqueous solution of KOH. The KOH may contain one or more ferrate-stabilizing compounds. The solids portion is added to this tank. The potassium ferrate in the solids will dissolve in this dilute KOH solution while the KCl and Fe(OH)$_3$ will substantially remain as solids. The tank is preferably equipped with agitation means and heating means to aid in the $K_2FeO_4$ dissolving. After the desired amount of $K_2FeO_4$ has dissolved, an aqueous slurry containing a liquid portion (the second liquid phase) and a solids portion (second insoluble phase) is drawn from the tank.

This slurry is transferred to a liquid/solids separation means, preferably a centrifuge. The solids portion which mainly contains KCl and Fe(OH)$_3$ is removed from the liquid portion. This separated solids portion is preferably recycled to a KCl brine treatment process where the KCl is separated from the Fe(OH)$_3$ and other substances. The Fe(OH)$_3$ is disposed of or later reused as a substitute for ferric salt. The recycled KCl, after the brine treatment, may be pure enough for reuse as brine for the membrane-type chlor/alkali electrolytic cell. Thus, another advantage of these processes is the by-product KCl may be reused.

When silicates are used as ferrate stabilizers, a substantial amount of impurities as silicate salts is transported to the brine purification system. The Fe(OH)$_3$ and silicate-bound impurities are removed and disposed of from the process by sequential chemical treating filtration, settling and ion-exchange in the brine purification system. Thus, still another advantage of this preferred embodiment is the continuous removal of ferrate-degrading impurities, allowing continuous economical production.

After this liquid/solids separation step, the liquids portion is transferred to a $K_2FeO_4$ crystallizer tank. This tank is filled with a very concentrated KOH solution (at least about 40% by weight). Potassium ferrate will crystallize and precipitate in this KOH solution, while any remaining KCl impurity will tend to stay soluble. The crystallization and precipitation step may be aided by cooling means attached to the tank, or other conventional means known for aiding crystallization. The tank may be also equipped with agitation means. The resulting slurry of $K_2FeO_4$ crystals in the KOH and $H_2O$ solution is drawn from the tank and transferred to another liquid/solids separation means, preferably a centrifuge.

The liquids portion of the slurry, after separation, may be transferred back to the ferrate reactor. Because this recycle stream is essentially made up of a concentrated solution of KOH, it will be the main source of KOH to the ferrate reactor after continuous production has begun. Furthermore, any $K_2FeO_4$ which remained soluble in this saturated KOH stream will not be lost.

The separated $K_2FeO_4$ crystals are transferred to a dimethylsulfoxide (DMSO) wash tank containing anhydrous DMSO. The separated $K_2FeO_4$ may contain small amounts of $H_2O$ and KOH entrapped within the crystals and this wash is employed to aid in their removal through their solubilization in the DMSO. The $K_2FeO_4$ is not soluble in the DMSO and the resulting slurry is transferred to another liquid/solids separation means, preferably another centrifuge. The purified $K_2FeO_4$ crystals are thus separated from the DMSO, which now contains small amounts of $H_2O$ and KOH. These latter impurities may be removed from the DMSO by simple distillation or flash-evaporation means and the resulting anhydrous DMSO may be recycled back to the wash tank. The separated KOH/$H_2O$ may be disposed of or recycled back to the ferrate reactor or another step in the process.

The separated purified $K_2FeO_4$ crystals are transferred to an anhydrous methanol wash tank, where any remaining traces of KOH or other impurities are solubilized from the $K_2FeO_4$ crystals. Like the DMSO wash tank, the methanol wash tank may be equipped with an agitator to aid solubilization of these impurities.

After a suitable time for this solubilization to occur, the slurry of methanol and $K_2FeO_4$ crystals is transferred to another liquid/solids separation means, again preferably a centrifuge.

After this separation, the methanol is also distilled or flash-evaporated to remove the KOH and other impurities. This pure anhydrous methanol may be then recycled back to the methanol wash tank. The KOH impurity may be disposed of or reused in other parts of the process, such as the ferrate reactor.

The very pure $K_2FeO_4$ crystals, after separation from the methanol, may be dried by any suitable means to remove traces of methanol from the product. This $K_2FeO_4$ product may be used directly or stored in an air-tight and moisture-proof container for future use.

The brine treatment step mentioned above is preferably a series of process steps where rock, solar, or well KCl brine, as well as the recycled KCl from the present process is purified before being added to a membrane-type electrolysis cell. Suitable KCl brine treatments are disclosed in U.S. Pat. No. 4,060,465, which issued to Yokota et al. on Dec. 10, 1975; U.S. Pat. No. 4,119,508, which issued to Yokota et al. on Oct. 10, 1978; and U.S. Pat. No. 4,176,022, which issued to Darlington on Nov. 27, 1979. All three of these U.S. patents are incorporated herein by reference in their entireties.

Following electrolysis, the depleted brine is removed continuously from the anode compartment and is then pumped to the beginning of the brine treatment process wherein it is saturated with new KCl from the outside sources.

The present invention is further illustrated by the following specific examples. All parts and percentages mentioned therein are by weight unless explicitly stated otherwise.

EXAMPLE 1

Production of Dry, Solid $K_2FeO_4$ From KOH, $Cl_2$, and $FeCl_3$

High-purity 35% potassium hydroxide and gaseous $Cl_2$ (see Analysis in Table 1) were made using a laboratory-scale membrane-type chlor/alkali cell made of polytetrafluoroethylene. The cell was 10.25" high by 6-1/4" wide and consisted of anolyte and catholyte chamber pieces of identical sizes which each have a thickness of 1.5". When sandwiched together with a cation-exchange membrane separator between the anolyte and catholyte, the cell width was about 3-1/8" thick. The anolyte and catholyte chambers both had a volume of 480 mls. The anode was a Beer-type DSA 1/4"×1/8" diamond expanded-metal mesh titanium flat piece of area 54.5 cm² (2.25"×3.75"). The cathode was a steel expanded mesh of diamond-dimensions 1/4"×1/8". Both anode and cathode were placed with 1/16" gaps between electrode and membrane.

The 35% KOH solution and gaseous $Cl_2$ were produced from the chlor/alkali cell in which deionized high-purity water was being added to the cathode chamber to control concentration. A 700 ml sample was collected for use in the present experiment during a typical run using a bilayer sulfonate/carboxylate chlor-/alkali membrane. Preceding the run, the membrane was pre-soaked in 2% pure NaOH for 24 hours at room temperature before start-up. The KCl brine at 300 grams per liter was purified before entering the cell by a brine treatment, i.e., precipitation and filtration using potassium hydroxide and potassium carbonate and followed by ion exchange purification using a Mitsubishi CR-10 chelating resin, to a KCl brine purity of less than 20 ppm calcium and other metals total.

Brine feed rate to the cell anolyte was about 7 milliliters/min. or adjusted to maintain an anolyte concentration of 220 grams per liter KCl. The cell was operating at 94% cathode current efficiency in terms of KOH at 3.64 volts at a constant current density of 2.0 KA/m² at the time of the KOH solution and $Cl_2$ gas collection.

500 mls. or 660 g of the 35% membrane cell KOH was placed in a 750 ml Pyrex flask. A gas bubbling tube was used to add the chlorine gas to the KOH continuously while stirring and maintaining the temperature below 20° C. using an immersion-tank ice bath. The chlorination was continued until only 1.0% KOH remained after filtration of the formed KCl salt from the solution. The resulting potassium hypochlorite solution weighed 734.2 g and analyzed 26.3% KOCl, 0.06% KOH, 0.68% $KClO_3$, 13.60% KCl, and 59.36% $H_2O$. 314.7 grams of membrane-cell grade KOH pellets were added slowly while maintaining the temperature below 20° C. The analysis of the filtered solution showed 16.38% KOCl, 31.23% KOH, 0.54% $KClO_3$, 0.96% KCl, and 50.89% $H_2O$.

To 500 mls. of this solution, which weighed about 750 grams, 0.04 grams of anhydrous cupric chloride, $CuCl_2$, and 0.55 grams of sodium para-periodate, $Na_3H_2IO_6$ and 1.5 grams of sodium meta-silicate were added and the solution was stirred at 20° C. for ten minutes, then filtered through a fine-fritted glass vacuum filter to remove excess KCl and other excess solids. The three ferrate-stabilizing compounds were Reagent Grade from Fisher Chemical (see their Analysis in Table 1).

A 500 ml beaker containing an overflow outlet spout was placed on a cooling and stirring plate apparatus in an ice bath and a smaller 200 ml beaker was placed below the outlet spout. 600.2 grams of the potassium hypochlorite solution containing the three stabilizers were placed into the beaker and an overhead stirrer and impeller was placed into the solution. Stirring was begun and 10.72 grams of crystalline ferric chloride was slowly added over a 10 minute period, maintaining the temperature of the reactor contents at about 35° C. Deep violet ferrate color was noted in the solution in less than one minute. After one-half hour of operation, the solution analyzed: 2.18% $K_2FeO_4$; 28.3% KOH; 10.58% KCl; 14.73% KOCl, and 44.21% $H_2O$. 10.72 grams more of ferric chloride was added and after 1.0 hour of operation, the reactor contents analyzed: 3.863% $K_2FeO_4$; 23.2% KOH; 17.86% KCl; 8.21% KOCl, and 46.87% $H_2O$.

The high-purity anhydrous ferric chloride $FeCl_3$ crystals of Reagent Grade from Fischer Chemical was used in this Example (see its Analysis in Table 1). It should be noted that all these analyses are of the dry solid material except for that of the two liquid organic solvents and the deionized water used in this Example.

After 1.0 hour of batch operation, continuous operation was begun and the contents of the stirred vessel began to overflow into the smaller beaker continuously. A solution made up of 577.2 grams per liter $FeCl_3$ in deionized water and 0.23 g/l $CuCl_2$, 5.1 g/l $Na_3H_2IO_6$ and 13.6 g/l $Na_2SiO_3$ was added at the rate of 23 mls/hr. 83 mls/hr. of 33% membrane-cell KOH was added. Chlorine gas, which was first bubbled through electronic-grade concentrated $H_2SO_4$, was added at the rate of 50 mls/min. using a Pyrex dip-tube immersed into the reactor contents. The following data were gathered from the run and calculations made of percent conversion of ferric feed to potassium ferrate:

| Type of Operation | Time After Run Started | $K_2FeO_4$ (wt % of overflow product) | Conversion of Fe(III) to Fe(VI) | Temp. (°C.) |
|---|---|---|---|---|
| Batch | 1 hr | 3.863% | 91.8% | 33 |
| Continuous | 2 hrs | 4.09% | 89.03% | 28 |
| Continuous | 3 hrs | 3.92% | 85.33% | 31 |
| Continuous | 4 hrs | 3.84% | 83.59% | 34 |

The run was shut down after 4.0 hrs. and the contents of both the stirred reactor and the overflow vessel were mixed. The total material weighed 976.3 g and analyzed: 3.97% $K_2FeO_4$; 23.6% KOH; 6.38% KOCl; 22.6% KCl; and 43.45% $H_2O$. This corresponds to an overall yield of Fe(III) to Fe(VI) conversion of 90.2% for 1.0 hour of batch operation and 3.0 hrs. of continuous operation.

50 grams of the reaction slurry was placed in an open container and analyzed daily. The following data were gathered:

| Time | Potassium Ferrate % |
|---|---|
| 0 hr. | 3.97% at 26° C. |
| 24 hrs. | 3.76% at 24° C. |
| 48 hrs. | 3.53% at 24° C. |
| 72 hrs. | 3.68% at 25° C. |
| 96 hrs. | 3.12% at 25° C. |

The remaining 926.3 grams of reactor slurry was made up to 45% KOH by the addition of 541 grams of high purity KOH pellets and stirring in an ice-bath keeping the temperature below 35° C. The slurry was then cooled on a cooling plate to −5° C. and centrifuged using a basket-type centrifugal filter running at 2500 rotations per minute on a 10-micron polypropylene cloth with a Celite pre-coat, about ⅛" thick. The resulting cake, after subtraction of the Celite precoat weight, weighed 205.25 g. and analyzed 11.2% $K_2FeO_4$ and 86.7% KCl by weight. The filtrate analyzed 1.3% $K_2FeO_4$; 6.2% KOCl; and 22% KOH; with the rest $H_2O$, and is suitable for flask vacuum evaporation to remove water and recycle back to the ferrate reactor.

At 30° C., 1100 mls of 20% membrane-cell KOH was added to and stirred thoroughly for 10 minutes to completely redissolve substantially all the $K_2FeO_4$ solids in the filter cake. This 20% KOH solution contained 2.32 g/l of sodium meta-silicate, 0.87 g/l of sodium para-periodate, and 0.05 g/l of anhydrous cupric chloride $CuCl_2$. After complete dissolution, the new slurry was again centrifuged, recovering almost all the $K_2FeO_4$ from the filter cake in the 1233 mls of purple filtrate. The filter cake appeared to be only brown $Fe(OH)_3$ and KCl with only trace quantities of purple ferrate.

The filtrate was brought to a 45% KOH concentration by the stirred addition of 555 mls of 55% KOH at 40° C. While stirring, the temperature of the liquid was brought down to −5° C. on a cooling plate with a dry ice/acetone bath. The crystalline slurry was filtered on a coarse-fritted glass vacuum filter, resulting in a black filter cake of potassium ferrate crystals. The filtrate was entirely suitable for flash vacuum evaporation to remove water and recycle back into the ferrate reactor.

The crystals were removed from the filter and washed in a stirred beaker at room temperature with 300 mls of dimethylsulfoxide (DMSO) (see Analysis in Table 1) for 10 minutes then filtered on a coarse-fritted glass vacuum filter to remove all traces of water. The crystals were then washed in a beaker with 500 mls of pure anhydrous methanol (see Analysis in Table 1) for 20 minutes, then filtered on a medium-fritted glass vacuum filter to partial wetness and placed in an open muffle oven at 80° C. After drying at 80° C., the crystals were weighed at 20.4 grams and analyzed 98.6% $K_2FeO_4$. This example resulted in making a dry, black crystalline powder with excellent long-term stability in air and good dry flow properties. In this example, the continuous flow reactor single-pass chemical conversion of ferric ion to potassium ferrate was 86.0% and the recovery efficiency after normal laboratory transfer losses was 46.8% recovery of available $K_2FeO_4$ crystals based on the total amount of $K_2FeO_4$ available in the stream exiting the ferrate reactor. All streams, however, could be recycled and true product recovery efficiencies may be much higher.

This example has illustrated the superior advantages of the process of the invention for large-scale production of potassium ferrate, especially with regard to product stability within the process.

TABLE 1

| | Purity of Reactants, Stabilizers and Solvents Parts per Million Parts (ppm) by Weight of Impurities | | | | | | | | | | | | |
|---|---|---|---|---|---|---|---|---|---|---|---|---|---|
| | Ca | Al | Mg | Cu | Ni | Mn | Cr | Mo | Co | Pb | V | Ti | Total Organics |
| KOH | 11.7 | 4.0 | 5.18 | <0.1 | 0.20 | 1.84 | <0.1 | <0.1 | 0.45 | <0.2 | <0.1 | 1.03 | * |
| $Cl_2$ | * | * | * | * | * | * | * | * | * | * | * | * | * |
| $FeCl_3$ | 7.02 | 0.64 | 17.5 | 78.2 | 45.0 | 639 | 3.71 | 9.64 | 15.8 | 40.9 | 3.46 | 1.15 | * |
| Sodium Silicate | 5.33 | <0.15 | 1.2 | <0.1 | 0.61 | 2.03 | 0.33 | <0.1 | 1.34 | <0.5 | <0.15 | 3.35 | * |
| Sodium Para-Periodate | 1050. | 11.7 | 550 | 5.32 | 32.8 | 13.5 | 0.98 | 1.30 | 7.28 | 4.61 | <0.2 | 17.7 | * |
| DMSO | 0.03 | 0.72 | 0.29 | 0.06 | 0.27 | 0.23 | 0.22 | 1.86 | 1.72 | 4.54 | 0.62 | 0.49 | NA |
| Methanol | <0.1 | 4.60 | 0.1 | <0.1 | <0.1 | <0.1 | <0.1 | 0.09 | <0.1 | 0.12 | <0.1 | <0.1 | NA |
| $CuCl_2$ | 8.6 | 2.3 | 4.6 | NA | 3.2 | 437 | 6.2 | 1.2 | 0.4 | 2.1 | <0.1 | <0.1 | * |
| Deionized $H_2O$ | <0.1 | <0.1 | <0.1 | 0.11 | <0.1 | <0.1 | <0.1 | <0.1 | <0.1 | <0.1 | 0.02 | <0.1 | NA |

NA = not applicable
* = not measured, but are normally less than 1 ppm
Hg, Ru, Pt, Rh, Os, Ir, and Pd were not analyzed for, but are normally less than 1 ppm

EXAMPLE 2

Using a method similar to that described in Example 1, the reactor stabilizer concentrations were 30–40 ppm $CuCl_2$, 0.2 wt. % $Na_2SiO_3$ and 0.1 wt. % $Na_3H_2IO_6$. In this example, the single-pass reactor conversion of Fe(III) to Fe(VI) was 62.5% and the solid recovery efficiency was 31.4% of available $K_2FeO_4$ crystals. The product was 96% $K_2FeO_4$.

EXAMPLE 3

Using a method similar to that described in Example 1, the reactor stabilizers used and their concentrations were 0.2 wt. % $Na_2SiO_3$ and 1.0 g/l $Na_5Cu(HIO_6)_2$. The copper complex used was made by the following procedure:

1.0 gram of $CuSO_4.5H_2O$, 3.67 grams of $Na_3H_2IO_6$, 1.0 grams of $K_2S_2O_8$ and 8.0 grams of pure KOH pellets were dissolved in 100 mls of deionized water. The solution was brought to boiling for 15 minutes and kept just below the boiling point for another 15 minutes, then cooled to room temperature, filtered through a fine-fritted glass filter; then the filtrate was cooled to 10° C. and filtered again in the same manner. The solution was brought to room temperature (25° C.) and mixed with 40 mls of 50% $NaNO_3$ solution. Stagnant solution crystallization was allowed at room temperature for 3.0 hours, then the precipitate formed was filtered in the same manner as above. The dark brown solid was washed with a few milliliters of deionized water, then dried open on the laboratory bench for 18 hrs. Several grams of the $Na_5Cu(HIO_6)_2$ material was obtained and was confirmed by a spectrophotometric absorbence peak at 412 nm.

This example resulted in a single-pass batch reactor conversion of 51% at Fe(III) to Fe(VI). An open beaker stability test of the reactor contents showed negligible loss of $K_2FeO_4$ product in the slurry from its original 2.127% $K_2FeO_4$ after 5 days of storage.

The above examples also illustrate that catalytic and ferrate-stabilizing complexes may be made either in the ferrate reactor or beforehand from certain metals and iodide salt species. Examples of such complexes are the following:

| | |
|---|---|
| $[Ag(HIO_6)_2]^{-5}$ | Bis(hydrogen periodato) argentate(III) |
| $[Cu(HIO_6)_2]^{-5}$ | Bis(hydrogen periodato) cuprate(III) |
| $[Au(HIO_6)_2]^{-5}$ | Bis(hydrogen periodato) aurate(III) |

Other suitable ferrate-stabilizing combinations may be made by combining one of the above-noted bis(hydrogen periodato) metal complexes with at least one alkali metal silicate. The general empirical formula for this latter complex is believed to be the following formula:

$$A_xH_yM(IO_6)_2 \cdot nH_2O$$

wherein

A is an alkali metal, preferably K or Na, cation;
M is either silver, copper, or gold in the +3 ion state;
$x+y=7$; and
$n=0$ to 18 waters of hydration

EXAMPLES 4–7 AND COMPARISONS 1–4

Stability Studies

The following table shows the superior stability of $K_2FeO_4$ products produced by the process of the present invention wherein membrane-grade KOH, a silicate stabilizer, an iodine-containing salt stabilizer and $CuCl_2$ were employed together with substantially pure $Cl_2$ and ferric chloride. As can be seen, the $K_2FeO_4$ made by the Comparisons degraded to $Fe(OH)_3$ in a shorter amount of time than the Examples.

The results also indicate the use of membrane-cell KOH, together with both stabilizers, gives superior results than when each is used individually.

The amount of $Na_2SiO_3$ used in Example 4 was 0.1% by weight of reaction mixture in the reactor. This does not necessarily mean that 0.1% was present in dry $K_2FeO_4$ product. In fact, none was analyzed for. The $Na_2SiO_3$ amounts in the aqueous solutions were 0.3% by weight.

The amount of $Na_3H_2IO_6$ used in Example 4 was 0.05% by weight of the reaction mixture in the reactor. This does not necessarily mean that 0.05% was present in the dry $K_2FeO_4$ product. In fact, none was analyzed for. The $Na_3H_2IO_6$ amounts in the aqueous solution were 0.2% by weight.

The amounts of $CuCl_2$ in the aqueous solution were not measured, but believed to be about 5–30 ppm based on the amount of copper originally present in the $FeCl_3$ reactant.

The membrane cell KOH used in these stability studies had a composition similar to that given in Table 1.

The mercury cell KOH used in these stability studies had the following average analysis:

| | |
|---|---|
| Ca | 5.0–19.0 ppm |
| Al | 0.3–0.5 |
| Mg | 0.08–0.38 |
| Cu | 0.02–0.2 |
| Ni | 0.04–0.46 |
| Mn | 0.03–0.19 |
| Cr | 0.05–0.23 |
| Mo | 0.18–0.28 |
| Co | 0.30–0.62 |
| Pb | 0.14–0.93 |
| V | 0.10–0.46 |
| Hg | 0.2–1.3 |
| Organics | 1–10 |

However, the amounts of mercury, molybdenum, and other metals and organics in mercury cell KOH sharply rise on occasion unpredictably to levels that are above 20 ppm in total. It is believed that those occasions of high impurity levels cause faster loss of $K_2FeO_4$ activity than membrane-cell grade KOH as indicated in Table 2, below.

TABLE 2

Stability Studies

| | Type of $K_2FeO_4$ Product | Type of KOH Reactant | Stabilizers Silicate | Iodine Salt | Loss of $K_2FeO_4$ Activity % Loss @ Time |
|---|---|---|---|---|---|
| Example 4 | 94% dry $K_2FeO_4$ | membrane cell KOH | $Na_2SiO_3$ | $Na_3H_2IO_6$ | 0% @ 6 wks. |
| Comparison 1 | 96% dry $K_2FeO_4$ | mercury cell KOH | none | none | 40% @ 8 wks. |
| Example 5 | 0.2% aqueous solution of $K_2FeO_4$ (pH 11–12) | membrane cell KOH | $Na_2SiO_3$ | $Na_3H_2IO_6$ | 7.3% @ 48 hrs. 100% @ 8 wks. |
| Comparison 2 | 0.2% aqueous solution of $K_2FeO_4$ (pH 11–12) | mercury cell KOH | $Na_2SiO_3$ | $Na_3H_2IO_6$ | 100% @ 3–4 hrs. |

TABLE 2-continued

Stability Studies

| Type of K$_2$FeO$_4$ Product | Type of KOH Reactant | Stabilizers Silicate | Iodine Salt | Loss of K$_2$FeO$_4$ Activity % Loss @ Time |
|---|---|---|---|---|
| Example 6 | 0.2% aqueous solution of K$_2$FeO$_4$ (pH 11-12) | membrane cell KOH | none | Na$_3$H$_2$IO$_6$ | 100% @ 5 wks. |
| Example 7 | 0.2% aqueous solution of K$_2$FeO$_4$ | membrane cell KOH | Na$_2$SiO$_3$ | none | 100% @ 4 days |
| Comparison 3 | 0.2% aqueous solution of K$_2$FeO$_4$ | membrane cell KOH | none | none | 100% @ 3 hrs. |
| Comparison 4 | 0.2% aqueous solution of K$_2$FeO$_4$ | mercury cell KOH | none | none | 100% @ 5 mins. |

REACTOR SLURRY STABILITY STUDIES

Stability experiments were also run using methods similar to the reaction slurry stability measurements taken in Example 1, using various stabilizing additives for comparative purposes. Using similar KOCl, KOH, KCl, and H$_2$O concentrations, stirred-batch reactor data was collected, then tests of the stability of the K$_2$FeO$_4$ in the reactor slurry were conducted. The following additives were used, K$_2$FeO$_4$ concentrations measured, and K$_2$FeO$_4$ stabilities observed as shown in Table 3:

TABLE 3

| Reactor Additives | | | | % K$_2$FeO$_4$ at Elapsed Times During Batch Reaction (Hours) | | | % K$_2$FeO$_4$ Remaining After Elapsed Time in Open Container at Room Temperature | Elapsed Time in Open Container at Room Temperature |
|---|---|---|---|---|---|---|---|---|
| Na$_3$H$_2$IO$_6$ | CuCl$_2$ (g/l) | Na$_2$SiO$_3$ (%) | Na$_5$Cu(HIO$_6$)$_2$ (g/l) | 1 | 2 | 3 | | |
| 0.167 g/l | 0.13 | 0.2 | 0.0 | 1.8 | 2.0 | 0.75 | 0 | 24 hrs. |
| 0.167 g/l | 1.03 | 0.2 | 0.0 | 1.75 | 1.0 | 0.36 | 0 | 24 hrs. |
| 0.167 g/l | 0.03 | 0.2 | 1.0 | 1.15 | 1.5 | 1.875 | 2.56 | 2 days |
| | | | | | | | 2.127 | 5 days |
| 0.167 g/l | 10.0 | 0.2 | 0.0 | 0 | 0 | 0 | 0 | — |
| 0.1% | 0.03 | 0.2 | 0.0 | n.m. | n.m. | 4.18 | 4.13 | 3 days |
| | | | | | | | 2.12 | 1 wk. |
| 0.0 | 0.03 | 0.2 | 0.0 | n.m. | n.m. | 3.1 | 0 | 3 days |
| 0.167 g/l | 0.03 | 0.2 | 0.0 | 1.6 | 1.05 | 1.12 | 1.56 | 2 days |
| 0.0 | 0.03 | 0.0 | 0.0 | n.m. | n.m. | 2.9 | 0 | 24 hrs. | n.m. = not measured

The results show that superior stability of the process streams of the present invention is achieved when silicate, periodate, and copper(II) chloride stabilizers are used in combination, and also when the sodium bis(hydrogen periodato) cuprate(III) complex salt is used in combination with silicate, thereby improving greatly the ferrate stability.

What is claimed is:

1. In a process for making a stabilized potassium ferrate which comprises the steps of:
   (a) reacting KOH with Cl$_2$ and a ferric salt to form a reaction mixture comprising a liquid phase comprising KOH, H$_2$O and KOCl and a solid phase comprising said potassium ferrate, KCl and Fe(OH)$_3$; and
   (b) separating and recovering said potassium ferrate from said reaction mixture;
   wherein said improvement comprises:
   carrying out said reaction step (a) with membrane cell-grade KOH, substantially pure Cl$_2$ and a substantially pure ferric salt in the presence of a stabilizing proportion of an alkali metal silicate as a ferrate-stabilizing compound.

2. The process of claim 1 wherein said ferrate-stabilizing compound further comprises an alkali metal iodine-containing salt.

3. The process of claim 2 wherein said ferrate-stabilizing compound comprises a combination of a sodium or potassium silicate and a sodium or potassium iodine-containing salt.

4. The process of claim 3 wherein a stabilizing metallic salt selected from copper, gold, and silver salts are additionally employed as said ferrate-stabilizing compounds.

5. The process of claim 1 wherein said alkali metal silicate comprises a silicate having the general formula:

mA$_2$O.nSiO$_2$.pH$_2$O where A is sodium or potassium, the ratio of n to m is from about 0.1:1 to about 5:1 and p ranges from 0 to 24.

6. The process of claim 5 wherein said alkali metal silicate is Na$_2$SiO$_3$.5H$_2$O.

7. A process for making a stabilized potassium ferrate (K$_2$FeO$_4$), comprising the steps of:
   (a) reacting a membrane cell-grade aqueous KOH solution with substantially pure Cl$_2$ and a substantially pure ferric salt in the presence of an alkali metal silicate as a ferrate-stabilizing compound to form a first liquid phase comprising H$_2$O, KOH, and KOCl and a first solid phase comprising stabilized K$_2$FeO$_4$, KCl, and Fe(OH)$_3$;
   (b) adjusting the KOH concentration of said reaction mixture to be at least 30% by weight of said reaction mixture;
   (c) separating said first solid phase from the first liquid phase;
   (d) adding said separated first solid phase to a sufficient amount of an aqueous KOH solution, said solution having a KOH concentration from about 5% to about 25% by weight, to solubilize a major portion of the stabilized $K_2FeO_4$ therein, thereby forming a second liquid phase comprising KOH, $H_2O$, and a major portion of said stabilized $K_2FeO_4$ and a second solid phase comprising at a portion of said KCl and $Fe(OH)_3$;

(e) separating said second liquid phase from said second solid phase;

(f) adding a sufficient amount of KOH to precipitate at least a portion of said stabilized $K_2FeO_4$ from said separated second liquid phase; and (g) separating and recovering said precipitated, stabilized $K_2FeO_4$ from said separated second liquid phase.

8. The process of claim 7 wherein said membrane cell-grade aqueous KOH and substantially pure $Cl_2$ each contain less than 10 parts per million parts (ppm) by weight of total harmful metallic and organic impurities, said harmful metallic impurities being Fe(II), Ni, Co, Mo, Hg, V, Cr Ru, Pt, Rh, Os, Ir, and Pd.

9. The process of claim 7 wherein said ferrate-stabilizing compound further comprises an alkali metal iodine-containing salt and a copper salt.

10. The process of claims 2 or 9 wherein said iodine containing salt is selected from the group consisting of NaI, $NaIO_3$, $NaIO_4$, $Na_3H_2IO_6$, KI, $KIO_3$, $KIO_4$, $K_3H_2IO_6$, or mixtures thereof.

11. The process of claim 10 wherein said iodine containing salt is $Na_3H_2IO_6$.

12. The process of claims 4 or 9 wherein said copper salt is selected from the group consisting of the chlorides, borates, permanganates, phosphates, chlorates, perchlorates, perbromates, or metal complexes of said copper.

13. The process of claim 12 wherein said copper salt is cupric chloride.

14. The process of claim 7 wherein said substantially pure ferric salt contains less than about 200 parts per million parts (ppm) by weight of total harmful metallic and organic impurities, said harmful metallic impurities being Fe(II), Ni, Co, Mo, Hg, V, Cr, Ru, Pt, Rh, Os, Ir, and Pd.

15. The process of claim 7 wherein the mole ratio of KOH to ferric salt during said reaction (a) is from about 1:1 to about 10:1 and the mole ratio of $Cl_2$ to ferric salt during said reaction (a) is from about 1.5:1 to about 30:1.

16. The process of claim 7 wherein at least a portion of said separated first liquid phase of step (c) is recycled back to the reaction of step (a).

17. The process of claim 7 wherein at least a portion of the separated second liquid phase of step (g) is recycled back to the reaction of step (a).

18. The process of claim 7 wherein at least a portion of said separated solid phase of step (e) is recycled back through a KCl brine treatment process to a membrane-type chlor/alkali electrolysis cell.

19. The process of claim 7 wherein a substantially pure $K_2FeO_4$ product is made by washing the $K_2FeO_4$ crystals of step (g) with at least one substantially pure anhydrous organic solvent and then drying said washed $K_2FeO_4$ crystals.

20. The process of claim 19 wherein said $K_2FeO_4$ crystals are washed first in substantially pure anhydrous dimethylsulfoxide and then washed in substantially pure anhydrous methanol.

21. A process for making a stabilized potassium ferrate which comprises the steps of:

(a) reacting a membrane cell-grade aqueous KOH solution with substantially pure $Cl_2$ and a substantially pure ferric salt in the presence of a stabilizing proportion of an alkali metal silicate as a ferrate-stabilizing compound to form a reaction mixture comprising KOH, $H_2O$ and KOCl and a solid phase comprising said potassium ferrate, KCl and $Fe(OH)_3$;

(b) separating and recovering said potassium ferrate from said reaction mixture; and (c) recycling said KCl to a membrane-type electrolytic cell and then making a membrane-grade aqueous KOH solution and substantially pure $Cl_2$ from said KCl.

22. A process for making a dry solid, substantially pure stabilized potassium ferrate product comprising the steps of:

(a) washing an impure potassium ferrate product in a substantially pure anhydrous first organic solvent selected from the group consisting of dimethylsulfoxide, diethylsulfoxide, dibenzosulfoxide, dimethylsulfone, and sulfolane;

(b) then washing said potassium ferrate product in a substantially pure anhydrous second organic solvent selected from the group consisting of methanol, ethanol, isopropanol and sec-butanol; and (c) then drying the washed potassium ferrate to form said dry solid, substantially pure potassium ferrate product.

23. The process of claim 22 wherein said first organic solvent is dimethylsulfoxide.

24. The process of claim 23 wherein said second organic solvent is methanol.

25. The process of claim 22 wherein said drying step is carried out from about 50° C. to about 100° C.

26. A process for making a stabilized potassium ferrate ($K_2FeO_4$), comprising the steps of:

(a) reacting a membrane cell-grade aqueous KOH solution with substantially pure $Cl_2$ and a substantially pure ferric salt in the presence of an alkali metal silicate, an alkali metal iodine-containing salt and a copper salt as a ferrate-stabilizing compound to form a first liquid phase comprising $H_2O$, KOH, and KOCl and a first solid phase comprising stabilized $K_2FeO_4$, KCl, and $Fe(OH)_3$;

(b) adjusting the KOH concentration of said reaction mixture to be at least 30% by weight of said reaction mixture;

(c) separating said first solid phase from the first liquid phase;

(d) adding said separated first solid phase to a sufficient amount of an aqueous KOH solution, said solution having a KOH concentration from about 5% to about 25% by weight, to solubilize a major portion of the stabilized $K_2FeO_4$ therein, thereby forming a second liquid phase comprising KOH, $H_2O$, and a major portion of said stabilized $K_2FeO_4$ and a second solid phase comprising at a portion of said KCl and $Fe(OH)_3$;

(e) separating said second liquid phase from said second solid phase;

(f) adding a sufficient amount of KOH to precipitate at least a portion of said stabilized $K_2FeO_4$ from said separated second liquid phase; and (g) separating and recovering said precipitated, stabilized $K_2FeO_4$ from said separated second liquid phase.

27. The process of claims 4, 9 or 26 wherein said alkali metal silicate is added in an amount ranging from about 0.01% to about 1.0%, said iodine containing salt is added in an amount ranging from about 0.01% to about 0.2% and said copper salt is added in an amount equal to about 0.001% to about 0.05% by weight of said reaction mixture.

28. The process of claim 27 wherein said alkali metal silicate is added in an amount ranging from about 0.05% to about 0.5%, said iodine containing salt is added in an amount ranging from about 0.04% to about 0.1% and said copper salt is added in an amount ranging from about 0.003% to about 0.04% by weight of said reaction mixture.

* * * * *